April 15, 1947.                N. R. HENRY                 2,418,974
             METHOD AND APPARATUS FOR FORMING FLEXIBLE TUBES
                          Filed Aug. 24, 1944
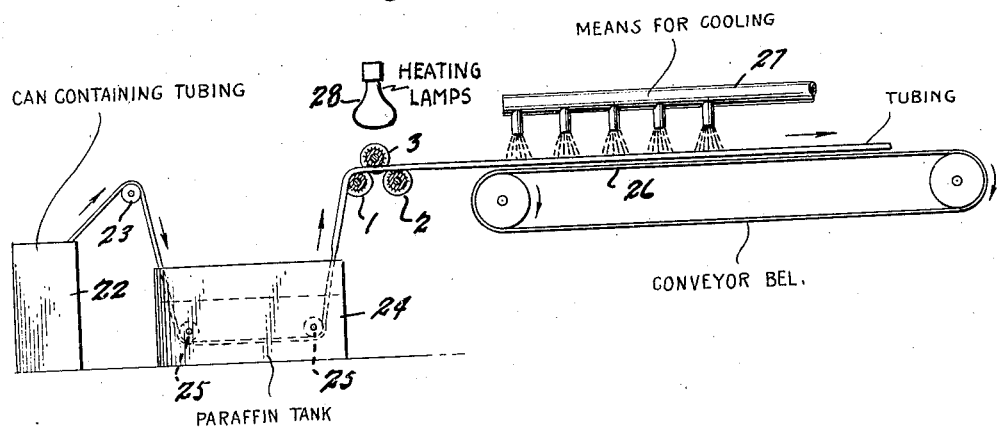
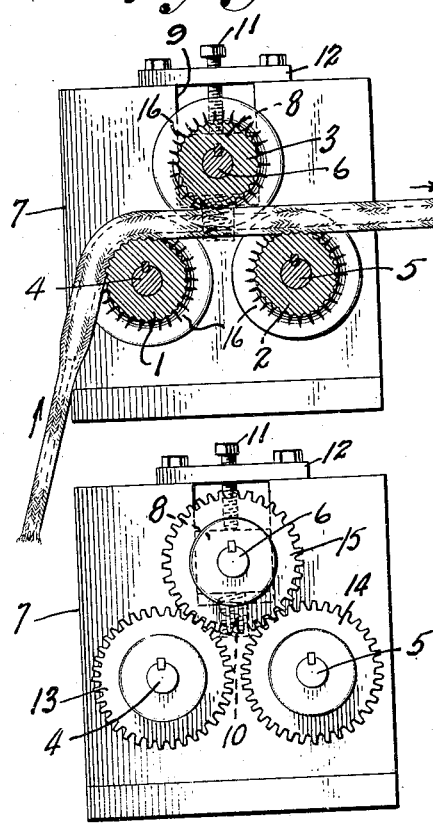
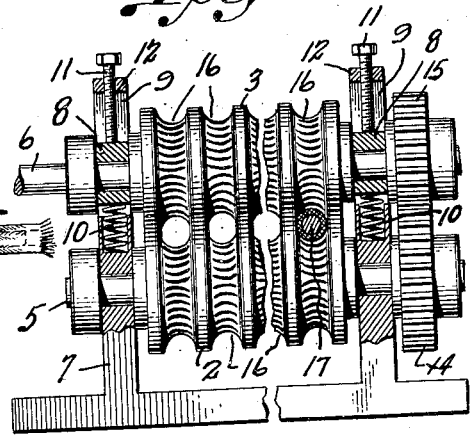

Patented Apr. 15, 1947

2,418,974

UNITED STATES PATENT OFFICE 2,418,974

METHOD AND APPARATUS FOR FORMING FLEXIBLE TUBES

Nelson R. Henry, Atlanta, Ga.

Application August 24, 1944, Serial No. 551,044

7 Claims. (Cl. 18—10)

This invention relates to shaping and sizing flexible tubing, and more particularly to the forming of woven or braided fiber tubing into a desired cross-sectional size and shape.

Braided fiber tubing is made from various materials such as cotton, hemp, jute, asbestos, etc., and is used for conduits, insulating coverings for electrical cables, and other purposes either untreated or impregnated with paraffin or other materials such as natural or synthetic resins and plastics.

As initially woven or braided, the tubing is composed of oppositely spiralling, interlaced strands in the form of a cylinder but subsequent handling often tends to flatten the tube in cross-section and, in any processing where tension is placed on the leading end of the tube, its diameter becomes reduced.

This reduction and flattening is especially pronounced when the tubing is drawn over the guide rolls in a bath of impregnating material as the plastic tends to reduce the natural resilience of the fibers with a result that they do not readily return to their normal condition. Also, when passed through the impregnating bath, a surplus of the material is absorbed by and clings to the tubing which must subsequently be removed.

It is the purpose of this invention to form braided fiber or similar flexible tubing in continuous lengths into a cylindrical or other predetermined cross-section of desired size, and if such tubing has first been impregnated with paraffin or other plastic impregnating material, to remove at the same time, surplus impregnating substance from the tubing.

This invention has for an object also to provide a simple but highly efficient apparatus for accomplishing the above purpose and which will positively and accurately form both the inside and outside of the tubing to the desired shape and size, and, if an impregnant has been applied, to control accurately the amount of impregnating material allowed to remain in the finished product.

Another object of this invention is to provide a method and apparatus for shaping and sizing flexible tubing in which tension on the tubing, after being shaped and sized, is eliminated with the result that the tubing remains in the desired shape and size.

With these and other objects in view which may be incident to my improvements, the invention consists in the procedural steps and the parts and combinations hereinafter set forth and claimed, with the understanding that the necessary elements comprising the invention and the procedural steps of its operation may be varied by those skilled in the art without departing from the spirit of the invention or the scope of the appended claims.

Broadly the invention embraces passing braided or woven fiber or other flexible tubing, either impregnated or not, over a mandrel having a cross-sectional size and shape of the desired internal cross-section of the tubing. At the same time, the tubing is drawn between rotating rolls which are peripherally grooved to correspond to the desired exterior cross-section of the tubing, the rolls frictionally engaging the tubing to move it therebetween, and the mandrel being so formed as to prevent it from being drawn through the rolls with the tubing.

In order to make my invention more clearly understood, reference is made to the accompanying drawings which are for the purpose of illustrating only a preferred means for carrying the invention into practical effect.

In the drawings:

Figure 1 is a flow diagram illustrating one series of steps employed in shaping and sizing tubing in accordance with the present invention.

Figure 2 is a transverse sectional view of a preferred arrangement of forming rolls and mandrel cooperating therewith illustrating the portion of woven fiber tubing being shaped.

Figure 3 is a side elevational view partly broken away and partly in section of the apparatus illustrated in Figure 2.

Figure 4 is an end view of the apparatus illustrated in Figures 2 and 3.

Figure 5 is a view in perspective of one of the tube forming mandrels.

Referring more particularly to the drawings, there is illustrated in Figures 2 to 4 a preferred arrangement of the forming rolls mentioned above. While various arrangements and numbers of rolls may be employed, I prefer the arrangement illustrated which consists of a pair of laterally spaced rolls 1 and 2 and an upper roll 3 positioned above and midway between the lower rolls and parallel therewith. The lower rolls 1, 2 and 3 are respectively keyed to parallel shafts 4, 5 and 6, which are journalled in a suitable roll stand 7.

While it is within the concept of this invention that each of the rolls may bear a fixed relationship with each other, I prefer, for the purpose to be hereinafter set forth, that the upper roll 3 shall be adjustable vertically with respect to the lower rolls 1 and 2. To accomplish this adjustment, opposite ends of the shafts 6 are each journalled in a bearing block or slide 8 slidably carried in bifurcations 9 in the upper part of the roll stand. A compression spring 10 is positioned beneath each of the slides 8 tending normally to raise the upper roll 3 relative to the lower rolls. An adjustment screw 11, threaded into a strap member 12, secured to the upper part of the roll stand bears against the upper edge of each of the slides 8 to adjust the upper roll toward or away from the lower rolls.

To effect rotation of the rolls, each of the shafts 4, 5 and 6 have secured to one end thereof gears respectively designated as 13, 14 and 15, the upper gear 15 meshing with and driving both of the lower gears 13 and 14. As shown in Figure 3, the end of the shaft 6, opposite that to which the gear 15 is attached, is extended and may be provided with suitable means for driving the shaft such as a pulley or sprocket.

To form the tubing, the rolls 1, 2 and 3 are each provided with one or more peripheral grooves 16. These grooves may be of any desired shape depending on the desired shape of the tubing to be formed thereby. In the illustrated example the grooves are semi-cylindrical in cross-section, the grooves in the upper roll cooperating with those in the lower rolls to form tubing into a cylindrical cross-sectional shape when passed between the upper and lower rolls. These grooves may be machined with a smooth surface or, if desired, they may be roughened to increase the frictional engagement between the rolls and the tubing. This roughening may be accomplished by knurling or any other suitable means or, if desired, a design may be impressed or raised in the surface of the grooves to apply a like design on the exterior surface of the tubing passing between the rolls.

Cooperating with the rolls 1, 2 and 3, which are adapted to form the exterior of the tubing as set forth above, is a mandrel 17 designed for forming the interior of the tubing. This mandrel is best illustrated in Figure 5 and consists of a rod having substantially the cross-section of the cooperating grooves of the rolls, in this case cylindrical. The mandrel 17 has a straight portion 18 somewhat longer than the distance between the axes of the lower rolls 1 and 2. In order to prevent the mandrel from being drawn through the rolls with the tubing in the forming operation, one end 19 of the mandrel is downbent from the straight portion 18 on a radius 20 substantially that of the diameter of the grooves of the rolls. The end of the down-bent portion 19 preferably is tapered as indicated at 21.

The operation of the apparatus is probably best seen by reference to Figure 2. At the start of the operation the mandrel 17 is inserted in one end of the tubing to be formed, the tapered end 21 being inserted first. The tube covered mandrel is then passed between the grooves of the rotating rolls which frictionally engage the tubing and draw it therebetween. When the end of the tubing has been moved the length of the straight portion of the mandrel, the down-bent end 19 engages the leading lower roll, which in the illustration is the roll 1, and further movement of the mandrel is prevented. Thereafter the rolls draw the tubing over the mandrel. During this operation the tubing is pressed between the grooved rolls and mandrel and is formed into the shape determined by the cooperating shapes of the mandrel and the grooves of the rolls. In the event that the tubing being formed had previously been flattened, as indicated in Figure 2, the mandrel will spread this flattened cross-section into the cross-sectional shape of the mandrel. Because of the fact that the rolls are in effect pushing the tubing therebetween, or in other words since there is no tension on the leading end of the tubing, the shape and size to which the rolls and mandrel have formed the tubing will remain after the tubing has passed between the rolls.

The apparatus just described is particularly adapted to the shaping and sizing of tubing which has been impregnated with paraffin or other plastic material, the apparatus functioning simultaneously to draw the tubing through the impregnating bath, squeeze out surplus impregnant, shape the tubing to the exact desired cross-section and size, and feed the shaped tubing to a hardening step.

In Figure 1 there is illustrated diagrammatically one arrangement for carrying out this process. The tubing is run from the usual storage can 22 over a guide roll 23 and thence through a bath of the impregnant, which in this case is melted paraffin contained in a tank 24, guide rolls 25 keeping the tubing submerged during its passage through the tank. After leaving the tank 24, the tubing is passed over the mandrel 17 and between the grooved rolls 1, 2 and 3 and thence onto a conveyor belt 26 or other suitable moving conveyor which travels at the same surface speed as the grooved rolls. This conveyor is positioned substantially close to the grooved rolls and suitable means, such as a water spray head 27, is associated therewith to direct a spray of cooling water onto the tube to harden the paraffin. In lieu of the water spray, obviously cold air may be blown onto the tubing or it may be passed through a refrigerated tunnel or chamber.

Under certain conditions it may be desirable to apply heat adjacent the forming rolls to maintain the paraffin in the tubing liquid and to warm the rolls to prevent squeezed out paraffin congealing on the rolls. For this purpose any suitable source of heat may be employed, such as the illustrated infra-red lamps 28.

As stated, in passing through the paraffin tank, paraffin in excess of that required in the impregnated tube is absorbed and clings to the tubing. However, in its passage through the rolls this excess is squeezed out; the amount allowed to remain being closely controlled by the adjustment between the upper roll 3 and the lower rolls 1 and 2 which increases or decreases the distance between the grooves in the rolls and the mandrel to increase or decrease the pressure exerted on the wall of the tubing. The squeezed-out paraffin may be returned to the tank 24, if desired, by any conventional means such as a collection basin and return duct.

Besides adjusting the relative distance between the cooperating rolls to vary the pressure exerted on the tubing, it is within the scope of this invention to include also other means such as increasing or decreasing the cross-section of the mandrel with respect to the cross-section of the grooves, or by varying the depth, width, or general cross-section of the grooves with respect to the mandrel. Still another way is to vary the depth and spacing of the knurling in the grooves.

The forming and sizing apparatus is equally well suited for processing tubing impregnated with other plastic materials either thermoplastic or thermosetting. The action will be substantially the same as set forth above, that is, the amount of impregnation will be accurately controlled and the tubing accurately sized and shaped. In the case of thermosetting plastics, after passing through the rolls, it may be fed directly to and through the setting oven without deformation.

While the described apparatus functions with particular efficiency in connection with tubing which has first been impregnated, its use is not limited to such conditions as untreated tubing may be formed and sized thereby and, if desired, impregnated, waterproofed, coated or otherwise treated after forming.

In all of the above operations a primary advantage is gained which materially advances this invention over prior practice. The tubing is fed by the forming operation and thereby eliminates tension on the tubing after formation which otherwise would tend to again deform the tube.

I claim:

1. An apparatus for shaping and sizing continuous lengths of pre-formed woven fiber and the like tubing comprising cooperating peripherally grooved feed rolls adapted to engage and move longitudinally the tubing therebetween, the grooves combining to substantially define the desired exterior size and shape of the tubing, floating mandrel means comprising an elongated body adapted to be inserted in the tubing and to be positioned in said grooves, said body having a cross-section substantially defining the desired interior size and shape of the tubing, the trailing end of said body being deformed to engage one of said rolls to prevent relative movement of the mandrel with respect to the rolls when the tubing is moved therebetween.

2. An apparatus for shaping and sizing continuous lengths of pre-formed woven fiber and the like tubing comprising a frame, a pair of parallel, radially spaced, grooved feed rolls journalled therein, a third grooved roll journalled in the frame above said pair and intermediate therebetween, the third roll cooperating with the pair of rolls to engage and move longitudinally the tubing therebetween and the grooves of the pair of rolls combining with the grooves in the third of rolls combining to substantially the desired exterior roll to define substantially the desired exterior size and shape of the tubing, an elongated mandrel adapted to be inserted in the tubing and to be positioned between the third roll and the pair of rolls and lying within the grooves thereof, said mandrel having a cross-section substantially defining the desired interior size and shape of the tubing, and said mandrel having a straight portion of sufficient length to overlie said pair of rolls and a bent end whereby the mandrel is prevented from being drawn between the rolls as the tubing is moved therebetween.

3. An apparatus according to claim 2 in which means are provided for adjusting the third roll radially with respect to the pair of rolls to vary the clearance between walls of the grooves and the mandrel therein.

4. An apparatus according to claim 2 in which the walls of the grooves are roughened to increase the frictional engagement between said grooves and tubing.

5. A method of shaping and sizing preformed woven fiber and the like tubing comprising the steps of impregnating the tubing with a plastic material, moving the tubing between rotating forming rolls and over a mandrel inserted in the tubing and positioned between said forming rolls, applying pressure to the wall of the tubing during the passage thereof between said forming rolls to remove excess impregnant from the tubing, controlling the amount of applied pressure to thereby control the amount of impregnant allowed to remain in the tubing, and hardening the plastic after passage of the tubing through said forming rolls while supporting said tubing.

6. An apparatus for shaping and sizing continuous lengths of preformed woven fiber and the like tubing comprising cooperating perpherally like tubing comprising cooperating peripherally grooved feed rolls adapted to engage and move longitudinally the tubing therebetween, the grooves combining to substantially define the desired exterior size and shape of the tubing, and a floating mandrel comprising a substantially straight and elongated body having a cross section substantially defining the desired interior size and shape of the tubing, said body adapted to be inserted in the tubing and to be positioned in said grooves, and a trailing end for the body bent at an angle thereto and adapted to engage one of said rolls whereby the mandrel is prevented from being drawn by the rolls as the tubing is moved therebetween.

7. An apparatus according to claim 6 in which means are provided for adjusting one of said rolls with respect to a cooperating roll to vary the clearance between the walls of said grooves and the body of said mandrel.

NELSON R. HENRY.

REFERENCES CITED

The following references are of record in the file of this patent:

UNITED STATES PATENTS

| Number | Name | Date |
|---|---|---|
| 271,911 | Pearson | Feb. 6, 1883 |
| 2,090,669 | Dreyfus et al. | Aug. 24, 1937 |
| 1,954,635 | Leonard, Jr. | Apr. 10, 1934 |
| 2,140,213 | Tegarty | Dec. 13, 1938 |
| 2,284,866 | Hansson | June 2, 1942 |
| 2,324,654 | Prehler | July 20, 1943 |
| 2,339,286 | Moule | Jan. 18, 1944 |
| 2,208,958 | Brown et al. | July 23, 1940 |
| 1,586,249 | Krogh et al. | May 25, 1926 |
| 1,863,873 | Quarnstrom | June 21, 1932 |